US012388801B2

(12) United States Patent
Wee

(10) Patent No.: US 12,388,801 B2
(45) Date of Patent: Aug. 12, 2025

(54) BROADCAST ENCRYPTION WITH IMPROVED RESOURCE UTILIZATION

(71) Applicant: NTT Research, Inc., Sunnyvale, CA (US)

(72) Inventor: Hoeteck Wee, San Francisco, CA (US)

(73) Assignee: NTT Research, Inc., Sunnyvale, CA (US)

( * ) Notice: Subject to any disclaimer, the term of this patent is extended or adjusted under 35 U.S.C. 154(b) by 112 days.

(21) Appl. No.: 18/572,069

(22) PCT Filed: Jun. 17, 2022

(86) PCT No.: PCT/US2022/034089
§ 371 (c)(1),
(2) Date: Dec. 19, 2023

(87) PCT Pub. No.: WO2022/266502
PCT Pub. Date: Dec. 22, 2022

(65) Prior Publication Data
US 2024/0283779 A1   Aug. 22, 2024

Related U.S. Application Data

(60) Provisional application No. 63/212,633, filed on Jun. 19, 2021.

(51) Int. Cl.
*H04L 9/40* (2022.01)
*H04L 9/06* (2006.01)
*H04L 9/30* (2006.01)

(52) U.S. Cl.
CPC ........ *H04L 63/0428* (2013.01); *H04L 9/0618* (2013.01); *H04L 9/30* (2013.01)

(58) Field of Classification Search
CPC ..... H04L 63/0428; H04L 9/0618; H04L 9/30; H04L 9/3093; H04H 60/23
See application file for complete search history.

(56) References Cited

U.S. PATENT DOCUMENTS

| | | | |
|---|---|---|---|
| 6,298,137 B1 | 10/2001 | Hoffstein | |
| 8,837,738 B2* | 9/2014 | Huang | H04L 9/0836 380/281 |
| 9,806,890 B2* | 10/2017 | Ibraimi | H04L 9/3255 |
| 11,251,954 B2* | 2/2022 | Dolev | H04L 9/3073 |
| 2004/0103286 A1 | 5/2004 | Geiringer | |

(Continued)

OTHER PUBLICATIONS

International Search Report and Written Opinion in PCT/US22/34089, dated Oct. 28, 2022, 7 pgs.

(Continued)

*Primary Examiner* — Beemnet W Dada
(74) *Attorney, Agent, or Firm* — CipherLaw

(57) ABSTRACT

A broadcast network can use a pairing-based broadcast encryption scheme for N users with $O(N^{1/3})$-sized parameters. A pairing-based ciphertext-policy attribute-based encryption (CP-ABE) scheme for the class of degree 3 polynomials can be implemented with compact parameters. The public key, ciphertext and secret keys comprise $O(n)$ group elements, where n is input length for the function. The constructions achieve adaptive security against unbounded collusions, and rely on the (bilateral) k-Lin assumption in prime-order bilinear groups.

9 Claims, 4 Drawing Sheets

(56) References Cited

U.S. PATENT DOCUMENTS

| | | |
|---|---|---|
| 2019/0327216 A1* | 10/2019 | Walters .................. H04L 9/30 |
| 2020/0169384 A1 | 5/2020 | Cheon |
| 2020/0186347 A1 | 6/2020 | Dolev |

OTHER PUBLICATIONS

Wu et al. "Bridging Broadcast Encryption and Group Key Agreement." In: International Conference on the Theory and Application of Cryptology and Information Security, 2011, [online] Retrieved from the Internet <URL: https://link.springer.com/chapter/10.1007/978-3-642-25385-0_8 >, entire document (18 pgs).

Extended European Search Report in 22825936.2, dated Jun. 25, 2024 (9 pgs).

Shweta Agrawal et al: "Optimal Broadcast Encryption from Pairings and LWE", IACR, International Association for Cryptologic Research vol. 20200221:121031; Feb. 20, 2020 (Feb. 20, 2020), pp. 1-34, Retrieved from the Internet: URL:http://eprint.iacr.org/2020/228.pdf.

Zhen Liu, Duncan S. Wong, Practical Attribute-Based Encryption: Traitor Tracing, Revocation and Large Universe , The Computer Journal, vol. 59, Issue 7, Jul. 2016, pp. 983-1004, https://doi.org/10.1093/comjnl/bxv101, 22pgs.

\* cited by examiner

BROADCAST ENCRYPTION WITH IMPROVED RESOURCE UTILIZATION

This application is a national stage application, filed under 35 U.S.C. § 371, of International Patent Application No. PCT/US2022/034089, filed Jun. 17, 2022, which claims the benefit of U.S. Provisional Application No. 63/212,633, filed Jun. 19, 2021, the contents of both of which are hereby incorporated in their entireties.

FIELD OF THE INVENTION

The disclosure relates to pairing-based broadcast encryption schemes with $O(N^{1/3})$-sized parameters, which achieves adaptive security against unbounded collusions.

BACKGROUND OF THE INVENTION

In ciphertext-policy attribute-based encryption (CP-ABE), ciphertexts ct are associated with a predicate f and a message m and keys sk with an attribute x, and decryption returns m when x satisfies f. Broadcast encryption is a special case of CP-ABE where the predicate is specified by a set $S \subseteq [N]$, and decryption returns m when $x \in S$. In both cases, we require security against unbounded collusions, so that an adversary that sees a ciphertext along with secret keys for an arbitrary number of attributes $x_1, x_2, \ldots$ learns nothing about m as long as none of these attributes satisfies f.

Broadcast encryption has been an active area of research since its introduction in the 1990s, where a major goal is to obtain schemes with short parameters, notably short ciphertexts ct and short public keys mpk. Prior work includes a pairing-based broadcast encryption scheme with constant-size ciphertext (ignoring the contribution from the set S) and secret keys; however, the scheme has large public keys mpk which is linear in the total number of users N, and moreover, decryption requires access to mpk. To address these shortcomings, the scheme could be modified to achieve $O(\sqrt{N})$-sized public keys, at the cost of a $O(\sqrt{N})$-sized ciphertext. Further work showed how to achieve $O(\sqrt{N})$-sized parameters (i.e., $|mpk|+|ct|+|sk|=O(\sqrt{N})$) under the standard k-Lin assumption, improving upon the q-type assumption, while additionally strengthening the security guarantees from selective to adaptive security.

Other prior work constructed a broadcast encryption scheme with poly(log N)-sized parameters from pairings and LWE. Nonetheless, the following basic problem remains open: Can we build a broadcast encryption scheme with $o(\sqrt{N})$-sized parameters (that is, $|mpk|+|ct|+|sk|=o(\sqrt{N})$) from (just) pairings?

Prior approaches for pairing-based broadcast encryption requires $|ct| \cdot \max\{|sk|, |mpk|\} = \Omega(N)$, which in turn implies a $\Omega(\sqrt{N})$ bound on the parameter size. Moreover, this is essentially optimal for a large class of approaches for pairing-based broadcast encryption, indicating that breaking the $\sqrt{N}$ barrier would require substantially new ideas.

BRIEF SUMMARY OF THE INVENTION

The invention relates to broadcast encryption as well as attribute-based encryption schemes.

The invention includes a pairing-based broadcast encryption scheme with $O(N^{1/3})$-sized parameters, breaking the long-standing $\sqrt{N}$ barrier. The broadcast encryption scheme achieves adaptive security against unbounded collusions, and relies on the bilateral k-Lin assumption in prime-order bilinear groups. In addition, the construction offers a range of trade-offs between ciphertext and key sizes. Prior to this work, it was not known how to achieve $o(\sqrt{N})$-sized parameters with selective security even with q-type assumptions or generic bilinear groups.

More generally, the invention includes a CP-ABE for degree 3 polynomials over $\{0,1\}^n$ (and more generally, $\mathbb{Z}_p^n$) where the public key, ciphertext and secret keys comprise of $O(n)$ group elements; this scheme also achieves adaptive security against unbounded collusions under the bilateral k-Lin assumption. The broadcast encryption scheme then follows as an immediate corollary, since we can encode set membership in $S \subseteq [N]$ as a degree 3 polynomial over $\{0,1\}^{O(N^{1/3})}$. Prior to this work, CP-ABE schemes with $O(n)$-sized parameters from pairings was only known for the class of degree 2 polynomials.

The design of the inventive schemes departs quite significantly from existing pairing-based ABE schemes, in that we exploit the power of "quadratic reconstruction". This idea was previously used to construct an information-theoretic, private-key analogue of broadcast construction—formally, conditional disclosure of secrets (CDS) for index—with $O(N^{1/3})$-sized parameters. However, the scheme only works over fields of characteristic 2, which are incompatible with bilinear groups operations "in the exponent". Instead, the invention provides new techniques for instantiating quadratic reconstruction with reference to functional encryption for degree 2 polynomials.

In various embodiments, a computer-implemented method, computing device, and computer-readable storage media are disclosed. In one example embodiment for encrypting a message for transmitting over a broadcast network to multiple recipients as a ciphertext, the computer-implemented method, computing device, and computer-readable storage media can comprise: receiving an authorized recipient set S at a broadcast module, wherein the authorized recipient set identifies a set of recipients with permission to recover a broadcast message, wherein S is a subset of $\{1, 2, \ldots, N\}$, wherein n is an integer such that $n^3 \geq N$, and wherein N is the total number of possible recipients of the message; generating a public key mpk at an authority, the public key mpk comprising three vectors $[v]_1$, $[w_1]_1$ and $[w_2]_1$ of n random group elements in a first source group, a random group element $[v_0]_1$ in the first source group, and a random group element $[\alpha]_T$ in a target group; receiving the public key mpk at the broadcast module from the authority; receiving or creating a message M for encryption; encoding the authorized recipient set S as a degree 3 polynomial, wherein the degree 3 polynomial has a coefficient vector f equal to a characteristic vector of the recipient set S, and wherein the vector f has a length $n^3$; cryptographically compressing the vector f using the vector $[w_2]_1$ of n group elements from the public key mpk and by sampling a random vector $w_3$ of n integers modulo p resulting in a digest of n group elements; generating a ciphertext of message M by: sampling a random scalar s; multiplying the random scalar s with the digest, the vector $w_3$ and the public key mpk; concatenating the output of the multiplying to form the ciphertext; and transmitting the ciphertext to the autorized recipients identified in the set S.

Further embodiments can include generating the ciphertext by
parsing mpk=$([w_1]_1, [w_2]_1, [v_0]_1, [v]_1, [\alpha]_T)$;
sampling s $\leftarrow \mathbb{Z}_p$, $w_3 \leftarrow \mathbb{Z}_p^n$;
and outputting ciphertext $$ct=[s]_1, [((I_n \otimes w_2 \otimes w_3)f^T + w_1^T)s]_1, [w_3s]_1, [(v_0 w_3 + v)s]_1, [\alpha s]_T \cdot M.$$

Further embodiments can include instructions for decrypting a ciphertext by a recipient to recover a broadcast message by receiving a ciphertext and an authorized recipient set at a receiver module from a remote broadcast module over a broadcast network, wherein the ciphertext further comprises a digest, and the digest further comprises information about a polynomial; receiving a key from an remote authority module, the key comprising group elements; checking whether the recipient is in a set of authorized recipients; computing the degree 3 polynomial that has a coefficient vector f equal to a characteristic vector of a recipient set S; wherein the degree 3 polynomial has a coefficient vector f equal to a characteristic vector of the recipient set S, and wherein the vector f has a length $n^3$; recovering the broadcast message by evaluating the polynomial with the digest using the group elements in a pairing algorithm; storing the recovered broadcast message for further processing at the receiver module.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments.

In the drawings.

DETAILED DESCRIPTION

Technical Overview

Figure 1:
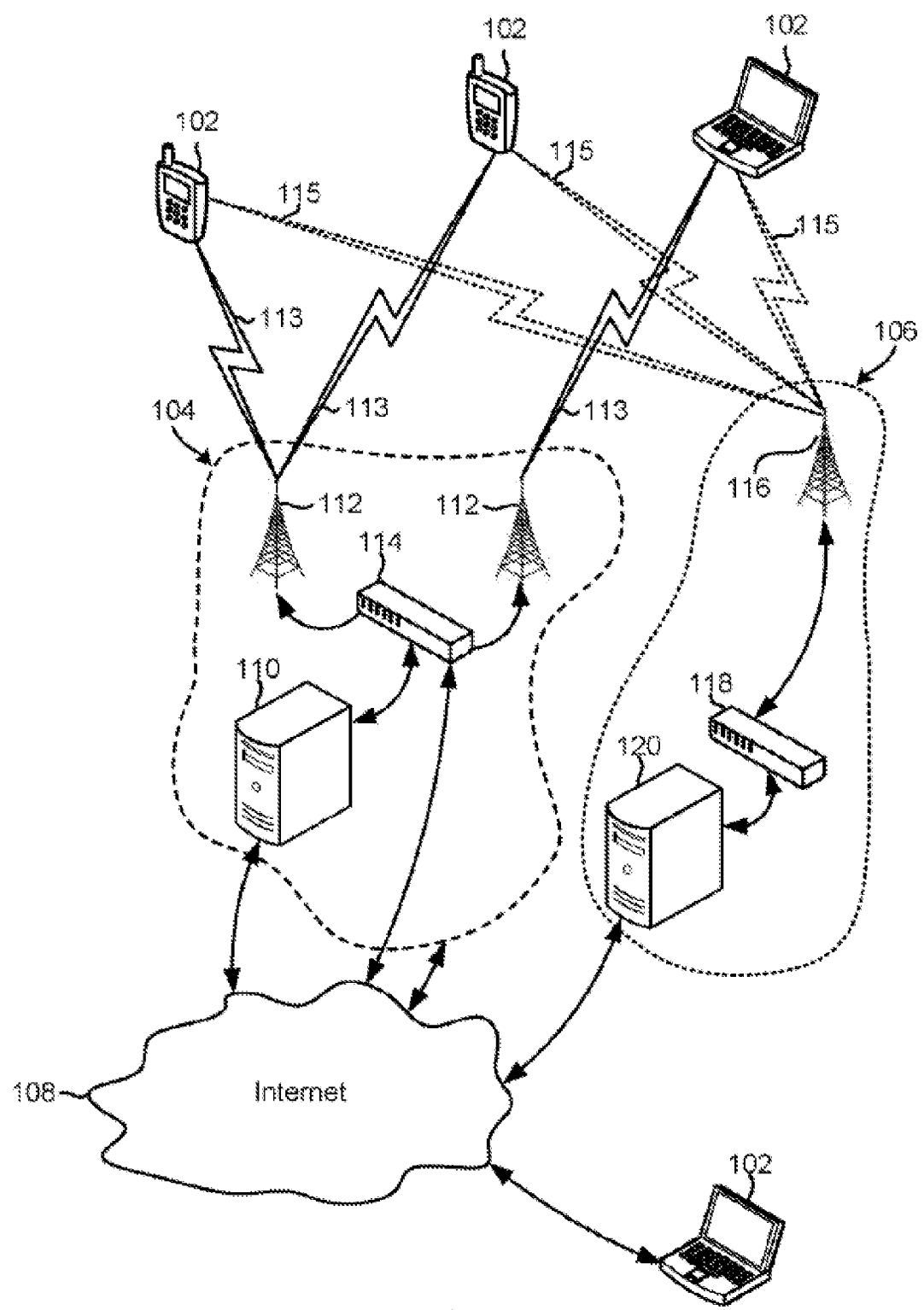
FIG. 1 is a block diagram illustrating a multimedia communication system suitable for use in various embodiments.

An overview of our constructions is disclosed herein. We focus on our CP-ABE scheme for degree 3 polynomials over $\mathbb{Z}_p^n \times \mathbb{Z}_p^n \times \mathbb{Z}_p^n$ given by $$(x_1, x_2, x_3) \mapsto (x_1 \otimes x_2 \otimes x_3) \cdot f^T$$

where $f \in \mathbb{Z}_p^{n^3}$ is the coefficient vector. Throughout, we use boldface lower case to denote row vectors. In our CP-ABE scheme, encryption takes as input $f \in \mathbb{Z}_p^{n^3}$ and a message M and outputs a ciphertext ct;

key generation takes as input $x_1, x_2, x_3 \in \mathbb{Z}_p^n$ and outputs a key sk; and decryption takes as input ct, sk along with f, $x_1, x_2, x_3$ and outputs message M whenever $(x_1 \otimes x_2 \otimes x_3) f^T \neq 0$.

We rely on an asymmetric bilinear group ($\mathbb{G}_1, \mathbb{G}_2, \mathbb{G}_T$, e) of prime order p where e: $\mathbb{G}_1 \times \mathbb{G}_2 \rightarrow \mathbb{G}_T$. We use $[\cdot]_1, [\cdot]_2, [\cdot]_T$ to denote component-wise exponentiations in respective groups $\mathbb{G}_1, \mathbb{G}_2, \mathbb{G}_T$. The k-Lin assumption in $\mathbb{G}_1$ asserts that $([A]_1, [sA]_1) \approx_c ([A]_1, [u]_1)$ where $s \leftarrow \mathbb{Z}_p^k$, $A \leftarrow \mathbb{Z}_p^{k \times (k+1)}$, $u \leftarrow \mathbb{Z}_p^{k+0}$. The bilateral k-Lin assumption as used in this work asserts that $([A]_1, [A]_2, [sA]_2) \approx_c ([A]_1, [A]_2, [u]_2)$, and is a strengthening of the k-Lin assumption in $\mathbb{G}_2$. In symmetric bilinear groups, the bilateral k-Lin and the standard k-Lin assumption are equivalent. Note that 1-Lin=DDH/SXDH, and that bilateral 1-Lin is false, for the same reason DDH is false in symmetric bilinear groups. We will describe our construction based the k-Lin assumption and the bilateral k'-Lin assumption, and set k=1, k'=2 for optimal concrete efficiency.

We make extensive use of tensor products. This enables a more compact description of our schemes, and avoids triple summations to compute a degree 3 polynomial. Moreover, we will be replacing scalars with vectors as our schemes get increasingly complex, upon which some scalar-vector products translate naturally to a tensor product of two vectors, whereas some other ones translate to a vector-matrix product.

Roadmap

Herein is described two candidate CP-ABE schemes for degree 3 polynomials.

The first achieves $|mpk|=O(n^2), |ct|=O(n), |sk|=O(n)$

In comparison, prior constructions based on degree 2 polynomials require either $|ct|=O(n^2)$ or $|sk|=O(n^2)$.

The second is a variant of the first with $|mpk|=O(n)$ and thus achieves O(n)-sized parameters.

Below it is described how to modify the second candidate to obtain our final CP-ABE scheme, which achieves O(n)-sized parameters as well as adaptive security under the bi-k-Lin assumption.

CP-ABE for Degree 2 Polynomials

Disclosed is a simplified variant of the CP-ABE scheme for the class of degree 2 polynomials over $\mathbb{Z}_p^n \times \mathbb{Z}_p^n$ given by $$(x_1, x_2) \mapsto (x_1 \otimes x_2) \cdot f^T$$

where $f \in \mathbb{Z}_p^{n^2}$ is the coefficient vector and decryption is possible whenever $(x_1 \otimes x_2) f^T \neq 0$:

$$mpk = [\alpha]_T, [w_2]_1, [w_1]_1, \qquad w_1 \leftarrow \mathbb{Z}_p^n, w_2 \leftarrow \mathbb{Z}_p^n, \alpha \leftarrow \mathbb{Z}_p \qquad (1)$$

$$ct = [s]_1, [((I_n \otimes w_2) f^T + w_1^T) s]_1, [\alpha s]_T \cdot M, \quad s \leftarrow \mathbb{Z}_p$$

$$sk = [r]_2, [x_1 r w_1^T]_2, [x_2 \alpha - r w_2]_2, \qquad r \leftarrow \mathbb{Z}_p$$

Note that the scheme achieves $|mpk|=O(n), |ct|=O(n), |sk|=O(n)$

Decryption uses $$(x_1 \otimes x_2) f^T \cdot \overbrace{\alpha s}^{sk \cdot ct} = (x_1 \otimes (\overbrace{(x_2 \alpha + r w_2) s}^{sk \cdot ct})) f^T + \qquad (2)$$

$$x_1 \overbrace{r}^{sk} \cdot \overbrace{((I_{n_1} \otimes w_2) \cdot f^T + w_1^T) s}^{ct} -$$

$$\overbrace{x_1 r w_1^T}^{sk} \cdot \overbrace{s}^{ct}$$

Following a dual system encryption methodology, security boils down to showing that M is hidden given a single ciphertext-key pair. In particular, it suffices to show that if $(x_1 \otimes x_2) f^T = 0$, then α is hidden given $$\hat{ct} = [(I_n \otimes w_2) \cdot f^\top + w_1^\top]_1, \quad (3)$$

$$\hat{sk} = [x_1 w_1^\top]_2, [x_2\alpha - w_2]_2,$$

where $\hat{ct}, \hat{sk}$ are derived from ct,sk by setting r=s=1 and omitting $[\alpha s]_T$. Hiding of $\alpha$ then follows from $$(\hat{ct}, \hat{sk}) \equiv \left(\tilde{w}_1^\top, ((x_1 \otimes \tilde{w}_2)f^\top + x_1 w_1^\top - \overbrace{(x_1 \otimes x_2)f^\top \cdot \alpha}^{=0}, \tilde{w}_2)\right)$$

Our First Candidate CP-ABE

A candidate CP-ABE is disclosed for degree 3 polynomials with parameter sizes

|mpk|=$O(n^2)$,|ct|=$O(n)$,|sk|=$O(n)$

To arrive at this scheme, we first replace $x_2$ and $w_2$ in (1) with $x_2 \otimes x_3$ and $w_2 \otimes w_3$ respectively, where $w_3 \leftarrow \mathbb{Z}_p^n$. Ta ciphertext size remains unchanged, but the secret key size increases to $O(n^2)$ due to the term $(x_2 \otimes x_3)\alpha - r(w_2 \otimes w_3)$ To achieve |sk|=$O(n)$, we compute the above expression using $$x_2 \otimes x_3\alpha - rw_2 \otimes w_3 = x_2 \otimes \overbrace{(x_3\alpha + r_3w_3)}^{sk} - \overbrace{(x_2r_3 + rw_2)}^{sk} \otimes \overbrace{w_3}^{ct}$$

This yields the following scheme:

$mpk = [\alpha]_T \quad [w_1]_1, [w_3]_1, [w_2 \otimes w_3]_1, \quad w_1, w_2, w_3 \leftarrow \mathbb{Z}_p^n, \alpha \leftarrow \mathbb{Z}_p$ (4)

$ct = [s]_1, [\alpha s]_T \cdot M, \; [((I_n \otimes w_2 \otimes w_3) \cdot f^\top + w_1^\top)s]_1, [w_3 s]_1, \quad s \leftarrow \mathbb{Z}_p,$ $sk = [r_2]_2, \quad [x_1 r_2 w_1^\top]_2, [x_2 r_3 + r_2 w_2]_2, [x_3\alpha + r_3 w_3]_2, \quad r_2, r_3 \leftarrow \mathbb{Z}_p$ Here, we publish $[w_2 \otimes w_3]_1$ in mpk so that we can compute $[(w_2 \otimes w_3)s]_1$ in ct.

Compressing Mpk

To get to a CP-ABE scheme with $O(n)$-sized parameters, we compress mpk in the previous scheme as follows: instead of having set-up pick $w_3$, the encryptor will sample a random $w_3$; this eliminates $[w_2 \otimes w_3]_1$ in mpk and reduces mpk to $O(n)$ group elements. Next, we explain how this modification impacts ct and sk in (4):

Given $[w_2]_1, w_3, s, f$, it is easy to compute $[(I_n \otimes w_2 \otimes w_3)s \cdot f^\top]_1$ and thus $[((I_n \otimes w_2 \otimes w_3) \cdot f^\top + w_1^\top)s]_1$ in ct.

Now, key generation can no longer compute $[x_3\alpha + r_3 w_3]_2$, which was used to compute $[(x_3\alpha + r_3 w_3)s]_T$ during decryption. Instead, we will compute the latter using the equation $$(x_3\alpha + r_3 w_3)s = \overbrace{(r_3 + r_2 v_0)}^{sk} \cdot \overbrace{w_3 s}^{ct} + \overbrace{(x_3\alpha + r_2 v)}^{sk} \cdot \overbrace{s}^{ct} - r_2 \cdot \overbrace{(v_0 w_3 + v)s}^{ct}$$

where $v_0, v$ are chosen by the set-up algorithm.

Putting these modifications together, the next candidate is obtained.

Our Second Candidate CP-ABE

The candidate CP-ABE scheme with $O(n)$-sized parameters is disclosed, where the terms not present in the previous scheme are shaded in large curly braces:

$mpk = [\alpha]_T[w_2]_1, [w_1]_1, \{[v]_1, [v_0]_1\} \quad w_1, w_2, v \leftarrow \mathbb{Z}_p^n, \alpha, v_0 \leftarrow \mathbb{Z}_p$ $ct = [s]_1, [\alpha s]_T \cdot M, [((I_n \otimes w_2 \otimes w_3)f^\top + w_1^\top)s]_1,$ $[w_3 s]_1, \{[(v_0 w_3 + v)s]_1\}, w_3 \leftarrow \mathbb{Z}_p^n, s \leftarrow \mathbb{Z}_p,$ $sk = [r_2]_2, [x_1 r_2 w_1^\top]_2, [x_2 r_3 + r_2 w_2]_2,$ $\{[r_3 + r_2 v_0]_2, [x_3\alpha + r_2 v]_2\}, r_3, r_2 \leftarrow \mathbb{Z}_p$ The decryption algorithm on input $ct=([s]_1, [\alpha s]_T \cdot M, [c_1^T]_1, [c_2]_1, [c_3]_1)$ and $sk=([r_2]_2, [d_1]_2, [d_2]_2, [d_3]_2, [d_4]_2)$, computes $[(x_1 \otimes x_2 \otimes x_3)f^T \cdot \alpha s]_T$ using $$\underbrace{(x_1 \otimes x_2 \otimes \overbrace{(d_3 c_2 + d_4 s - r_2 c_3)}^{(i)})f^\top}_{=(x_1 \otimes x_2 \otimes (x_3\alpha + r_3 w_3))s} -$$

$$\left(\underbrace{(x_1 \otimes \overbrace{(d_2(I_n \otimes c_2))}^{(ii)})}_{=(x_1 \otimes x_2 \otimes r_3 w_3)s + (x_1 \otimes r_2 w_2 \otimes w_3)s}\right)f^\top + \underbrace{\overbrace{r_2 x_1 c_1^\top}^{(iii)} - \overbrace{d_1 s}^{(iv)}}_{=(x_1 \otimes r_2 w_2 \otimes w_3)f^\top s}$$

where (i) = $(r_3 + r_2 v_0)(w_3 s) + (x_3\alpha + r_2 v)s - r_2(v_0 w_3 + v)s = (x_3\alpha + r_3 w_3)s$ (ii) = $(x_2 r_3 + r_2 w_2) \cdot (I_n \otimes w_3 s) = (x_2 \otimes r_3 w_3)s + (r_2 w_2 \otimes w_3)s$ (iii) = $x_1 r_2((I_n \otimes w_2 \otimes w_3)f^\top + w_1^\top)s = (x_1 \otimes r_2 w_2 \otimes w_3)f^\top s + x_1 r_2 w_1^\top s$ -continued (iv) = $x_1 r_2 w_1^\top s$

Our Final CP-ABE

We now describe how we arrive at our final CP-ABE for the class of degree 3 polynomials, which achieves adaptive security against unbounded collusions under the k-Lin assumption in $\mathbb{G}_1, \mathbb{G}_2$ and the bilateral k'-Lin assumption, where k≥1, k'≥2. We sample $A \leftarrow \mathbb{Z}_p^{(k+1) \times k}$, $B \leftarrow \mathbb{Z}_p^{k \times (k+1)}$ and make the following substitutions to the scheme in (??) combined with (??):

$s \mapsto As^\top \in \mathbb{Z}_p^{1 \times (k+1)}, \alpha \mapsto k \in \mathbb{Z}_p^{k+1}, r \mapsto rB \in \mathbb{Z}_p^{k+1}$ $w_2 \mapsto W_2 \in \mathbb{Z}_p^{(k+1) \times (k+1)k'n}, w_1^\top \mapsto W_1 \in \mathbb{Z}_p^{(k+1)n \times (k+1)},$ $v \mapsto V \in \mathbb{Z}_p^{(k+1) \times (k+1)n}, v_0 \mapsto V_0 \in \mathbb{Z}_p^{(k+1) \times (k+1)k'}$ That is, we increase the width and heights of each of $w_2$, $w_1^T$, $v$, $v_0$ by a multiplicative factor of k+1. A complete description of the scheme is provided herein.

Herein, a broader class of degree 3 polynomials over $\mathbb{Z}_p^{n_1} \times \mathbb{Z}_p^{n_2} \times \mathbb{Z}_p^{n_3}$ is described. By varying $n_1$, $n_2$, $n_3$, we obtain trade-offs between ciphertext and key sizes.

Notations

We denote by s←S the fact that s is picked uniformly at random from a finite set S. We use $\approx_s$ to denote two distributions being statistically indistinguishable, and $\approx_c$ to denote two distributions being computationally indistinguishable. We use lower case boldface to denote row vectors and upper case boldface to denote matrices. For any positive integer N, we use [N] to denote $\{1, 2, \ldots, N\}$.

Tensor Product

The tensor product (Kronecker product) for matrices $A=(a_{i,j}) \in \mathbb{Z}^{\ell \times m}$, $B \in \mathbb{Z}^{n \times p}$ is defined as $$A \otimes B = \begin{bmatrix} a_{1,1}B, & \ldots, & a_{1,m}B \\ \ldots, & \ldots, & \ldots \\ a_{\ell,1}B, & \ldots, & a_{\ell,m}B \end{bmatrix} \in \mathbb{Z}^{\ell n \times mp}.$$

The mixed-product property for tensor product says that $$(A \otimes B)(C \otimes D) = (AC) \otimes (BD)$$

A useful corollary of the mixed-product property says that for any pair of row vectors $u, v \in \mathbb{Z}^n$ $$u \otimes v = (u \otimes 1)(I_n \otimes v) = (1 \otimes v)(u \otimes I_n)$$
$$= u(I_n \otimes v) = v(u \otimes I_n)$$

We adopt the convention that matrix multiplication takes precedence over tensor product, so that we can write $A \otimes BC$ to mean $A \otimes (BC)$.

Prime-Order Bilinear Groups

A generator $\mathcal{G}$ takes as input a security parameter $1^\lambda$ and outputs a description $\mathbb{G} := (p, \mathbb{G}_1, \mathbb{G}_2, \mathbb{G}_T, e)$, where p is a prime of $\Theta(\lambda)$ bits, $\mathbb{G}_1, \mathbb{G}_2$ and $\mathbb{G}_T$ are cyclic groups of order p, and $e: \mathbb{G}_1 \times \mathbb{G}_2 \to \mathbb{G}_T$ is a non-degenerate bilinear map. We require that the group operations in $\mathbb{G}_1, \mathbb{G}_2, \mathbb{G}_T$ and the bilinear map e are computable in deterministic polynomial time in $\lambda$. Let $g_1 \in \mathbb{G}_1$, $g_2 \in \mathbb{G}_2$ and $g_T = e(g_1, g_2) \in \mathbb{G}_T$ be the respective generators. We employ the implicit representation of group elements: for a matrix M over $\mathbb{Z}_p$, we define $[M]_1 := g_1^M$, $[M]_2 := g_2^M$, $[M]_T := g_T^M$, where exponentiation is carried out component-wise. Also, given $[A]_1, [B]_2$, we let $e([A]_1, [B]_2) = [AB]_T$. We recall the matrix Diffie-Hellman (MDDH) assumption on $\mathbb{G}_1$[?]:

Assumption 1 ($\text{MDDH}^d_{k,\ell}$ Assumption) Let $k, \ell, d \in \mathbb{N}$. We say that the $\text{MDDH}^d_{k,\ell}$ assumption holds if for all PPT adversaries $\mathcal{A}$, the following advantage function is negligible in $\lambda$.

$$\text{Adv}_{\mathcal{A}}^{\text{MDDH}^d_{k,\ell}}(\lambda) :=$$

$$\left| \Pr\left[\mathcal{A}\left(\mathbb{G}, [M]_1, \boxed{[MS]_1}\right) = 1\right] - \Pr[\mathcal{A}(\mathbb{G}, [M]_1, \{[U]_1\}) = 1] \right|$$

where $\mathbb{G} := (p, \mathbb{G}_1, \mathbb{G}_2, \mathbb{G}_T, e) \leftarrow \mathcal{G}(1^\lambda)$, $M \leftarrow \mathbb{Z}_p^{\ell \times k}$, $S \leftarrow \mathbb{Z}_p^{k \times d}$ and $U \leftarrow \mathbb{Z}_p^{\ell \times d}$.

The MDDH assumption on $\mathbb{G}_2$ can be defined in an analogous way. Escala et al. [?] showed that $$k\text{-Lin} \Rightarrow \text{MDDH}_{k,k+1}^1 \Rightarrow \text{MDDH}^d_{k,\ell} \; \forall k, d \geq 1, \ell > k$$

with a tight security reduction. (In the setting where $\ell \leq k$, the $\text{MDDH}^d_{k,\ell}$ assumption holds unconditionally.)

The bilateral MDDH assumption is defined analogously with the advantage function:

$$\left| \Pr\left[\mathcal{A}\left(\mathbb{G}, [M]_1, \boxed{[MS]_1}, [M]_2, \boxed{[MS]_2}\right) = 1\right] - \right.$$
$$\left. \Pr[\mathcal{A}(\mathbb{G}, [M]_1, \{[U]_1\}, [M]_2, \{[U]_2\}) = 1] \right|$$

Note that the bilateral MDDH and bilateral k-Lin assumptions are false for k=1. In the disclosed embodiments, we only require a weaker variant of the bilateral MDDH assumption, as defined with the advantage function:

$$\left| \Pr\left[\mathcal{A}\left(\mathbb{G}, [M]_1, [M]_2, \boxed{[MS]_2}\right) = 1\right] - \Pr[\mathcal{A}(\mathbb{G}, [M]_1, [M]_2, \{[U]_2\}) = 1] \right|$$

Attribute-Based Encryption

We define attribute-based encryption in the framework of key encapsulation. A attribute-based encryption scheme for a predicate $P(\cdot, \cdot)$ consists of four algorithms (Setup, Enc, KeyGen, Dec):

Setup($1^\lambda$, $\mathcal{X}$, $\mathcal{Y}$)→(pp, mpk, msk). The setup algorithm gets as input the security parameter $\lambda$, the predicate domains $\mathcal{X}$, $\mathcal{Y}$ and outputs the public parameter mpk, and the master key msk.

Enc(mpk, x)→(ct, κ). The encryption algorithm gets as input mpk and $x \in \mathcal{X}$. It outputs a ciphertext ct and a symmetric key kem$\in \{0, 1\}^\lambda$.

KeyGen(msk, y)→sk. The key generation algorithm gets as input msk and $y \in \mathcal{Y}$. It outputs a secret key sk.

Dec (sk, y, ct, x)→κ. The decryption algorithm gets as input sk, ct, x, y such that P(x, y)=1. It outputs a symmetric key kem.

In the disclosed schemes, we can compute kem$\in \mathbb{G}_T$, which can then be hashed to $\{0, 1\}^\lambda$.

Correctness

We require that for all $(x, y) \in \mathcal{X} \times \mathcal{Y}$ such that P(x, y)=1, $$\Pr[(ct, kem) \leftarrow \text{Enc}(mpk, x); \text{Dec}(sk, y, ct, x) = kem)] = 1,$$

where the probability is taken over (mpk, msk)←Setup($1^\lambda$, $\mathcal{X}$, $\mathcal{Y}$) and the coins of Enc.

Security Definition

For a stateful adversary $\mathcal{A}$, we define the advantage function $$\text{Adv}_{\mathcal{A}}^{ABE}(\lambda) := \Pr\left[ b = b' : \begin{array}{l} (mpk, msk) \leftarrow \text{Setup}(1^\lambda, \mathcal{X}, \mathcal{Y}); \\ x \leftarrow \mathcal{A}^{KeyGen(msk, \cdot)}(mpk); \\ b \leftarrow_R \{0, 1\}; kem_1 \leftarrow_R \{0, 1\}^\lambda \\ (ct, kem_0) \leftarrow \text{Enc}(mpk, x); \\ b' \leftarrow \mathcal{A}^{KeyGen(msk, \cdot)}(ct, kem_b) \end{array} \right] - \frac{1}{2}$$

with the restriction that all queries y that $\mathcal{A}$ makes to KeyGen(msk, •) satisfies P(x, y)=0. An attribute-based encryption scheme is adaptively secure if for all PPT adversaries $\mathcal{A}$, the advantage $\text{Adv}_{\mathcal{A}}^{ABE}(\lambda)$ is a negligible function in $\lambda$.

CP-ABE for Degree 3 Polynomials

Here, $$\mathcal{X} = \mathbb{Z}_p^{n_1 n_2 n_3}, \; \mathcal{Y} = \mathbb{Z}_p^{n_1} \times \mathbb{Z}_p^{n_2} \times \mathbb{Z}_p^{n_3}$$

and $$P(f,(x_1,x_2,x_3))=1 \Leftrightarrow (x_1 \otimes x_2 \otimes x_3) \cdot f^T \neq 0$$

Broadcast Encryption

Here, $$\mathcal{X}=\{0,1\}^N, \mathcal{Y}=[N]$$

where $\{0,1\}^N$ is considered to be the power set of $[N]$ (i.e., set of all subsets of $[N]$), and $$P(S,y)=1 \Leftrightarrow y \in S$$

CP-ABE for Degree 3 Polynomials

Herein, we present an adaptively secure CP-ABE for degree 3 polynomials against unbounded collusions, under the k-Lin assumption in $\mathbb{G}_1$, $\mathbb{G}_2$ and the bilateral k'-Lin assumption, where $k \geq 1$, $k' \geq 2$. Our scheme achieves $$|mpk|=(k(k+1)+k(k+1)(n_1+k'n_2+n_3)+k')|\mathbb{G}_1|+|\mathbb{G}_T|$$

$$|ct|=(k+1+(k+1)n_1+(k+1)k'n_3+(k+1)n_3)|\mathbb{G}_1|$$

$$|sk|=(2k+1+(k+1)k'n_2+(k+1)k'+(k+1)n_3)|\mathbb{G}_2|$$

Setting $k=1$, $k'=2$, we obtain $$|mpk|=(2n_1+4n_2+2n_3+4)|\mathbb{G}_1|+|\mathbb{G}_T|, |ct|=(2n_1+6n_3+2)|\mathbb{G}_1|, |sk|=(4n_2+2n_3+7)|\mathbb{G}_2|$$

The Scheme

Setup(p, $1^{n_1}$, $1^{n_2}$, $1^{n_3}$): Run $\mathbb{G}=(\mathbb{G}_1, \mathbb{G}_2, \mathbb{G}_T, e) \leftarrow \mathcal{G}(p)$.

Sample $$A \leftarrow \mathbb{Z}_p^{(k+1) \times k}, k \leftarrow \mathbb{Z}_p^{k+1}, W_2 \leftarrow \mathbb{Z}_p^{(k+1) \times (k+1)k'n_2}, W_1 \leftarrow \mathbb{Z}_p^{(k+1)n_1 \times (k+1)},$$

$$V \leftarrow \mathbb{Z}_p^{(k+1) \times (k+1)n_3}, V_0 \leftarrow \mathbb{Z}_p^{(k+1) \times (k+1)k'}, B \leftarrow \mathbb{Z}_p^{k \times (k+1)}$$

For a matrix $M \in \mathbb{Z}_p^{(k+1)m \times (k+1)\ell}$, we write $\overline{M}:=M(I_\ell \otimes A) \in \mathbb{Z}_p^{(k+1)m \times k\ell}$. In particular, we have $$\overline{k}=kA, \overline{W}_2=W_2(I_{k'n_2} \otimes A), \overline{W}_1=W_1A, \overline{V}=V(I_{n_3} \otimes A), \overline{V}_0=V_0(I_{k'} \otimes A)$$

Output $$mpk=(\mathbb{G},[A]_1,[\overline{k}]_T,[\overline{W}_2]_1,[\overline{W}_1]_1,[\overline{V}]_1,[\overline{V}_0]_1), msk=(k,W_1,W_2,V,V_0,B)$$

Enc(mpk,f): Sample $$s \leftarrow \mathbb{Z}_p^k, W_3 \leftarrow \mathbb{Z}_p^{k \times n_3}$$

and output $$ct=(\underbrace{[As^\top]_1}_{c_0^\top}, \underbrace{[(I_{n_1} \otimes (\overline{W}_2(I_{n_2} \otimes W_3 \otimes s^\top)))f^\top + \overline{W}_1 s^\top]_1}_{c_1^\top},$$

$$\underbrace{[W_3 \otimes As^\top]_1}_{C_2}, \underbrace{[\overline{V}_0(W_3 \otimes s^\top) + \overline{V}(I_{n_3} \otimes s^\top)]_1}_{C_3}), kem=[\overline{k}s^\top]_T$$

KeyGen(msk, $x_1$, $x_2$, $x_3$): Sample $$r_2 \leftarrow \mathbb{Z}_p^k, r_3 \leftarrow \mathbb{Z}_p^{(k+1)k'}$$

and output $$sk=(\underbrace{[r_2B]_2}_{d_0}, \underbrace{[(x_1 \otimes r_2B)W_1]_2}_{d_1},$$

$$\underbrace{[(x_2 \otimes r_3 + r_2BW_2]_2}_{d_2}, \underbrace{[(r_3 + r_2BV_0]_2}_{d_3}, \underbrace{[(x_3 \otimes k + r_2BV]_2}_{d_4})$$

Dec(sk, ($x_1$, $x_2$, $x_3$), ct, f): Output $$[(x_1 \otimes x_2 \otimes \overbrace{(d_3C_2 + d_4(I_{n_3} \otimes c_0^\top) - d_0C_3)}^{(i)})f^\top -$$

$$(x_1 \otimes \overbrace{(d_2(I_{n_2} \otimes C_2))}^{(ii)})f^\top + \overbrace{(x_1 \otimes d_0)c_1^\top}^{(iii)} - \overbrace{d_1c_0^\top}^{(iv)}]_T[((x_1 \otimes x_2 \otimes x_3)f^\top)^{-1}]$$

where the terms in (i), (ii), (iii), (iv) are computed in $\mathbb{G}_T$ using the pairing.

Broadcast Encryption with Size $N^{1/3}$

We can encode broadcast encryption for N parties as CP-ABE for degree 3 polynomials whenever $n_1 n_2 n_3 \geq N$, by using the folklore encoding of set membership in $S \subseteq [N]$ as a degree 3 polynomial over $\{0,1\}^{n_1} \times \{0,1\}^{n_2} \times \{0,1\}^{n_3}$:

given a set $S \subseteq [N]$, let $f=(f_1, \ldots, f_N) \in \{0,1\}^N$ denote the characteristic vector for the set S (that is, $f_i=1$ iff $i \in S$);

given $y \in [N]$, we can pick $x_1 \in \{0,1\}^{n_1}$, $x_2 \in \{0,1\}^{n_2}$, $x_3 \in \{0,1\}^{n_3}$ such that $x_1 \otimes x_2 \otimes x_3 \in \{0,1\}^{n_1 n_2 n_3}$ is the characteristic vector of the set $\{y\}$;

then, $(x_1 \otimes x_2 \otimes x_3)f^T=1$ iff $y \in S$.

We can then set $n_1=N^\delta$, $n_2=N^{1-2\delta}$, $n_3=N^\delta$ for any $0 \leq \delta \leq 1/3$, which yields $$|mpk|=O(N^{1-2\delta}), |ct|=O(N^\delta), |sk|=O(N^{1-2\delta})$$

In particular, when $\delta=1/3$, we achieve $$|mpk|=O(N^{1/3}), |ct|=O(N^{1/3}), |sk|=O(N^{1/3})$$

File System Example Embodiment

The inventive scheme can be configured for efficiency. We can instantiate our scheme with the popular BIS12-381 curve with $|\mathbb{G}_1|$ being 48 bytes and $|\mathbb{G}_2|$ being 96 bytes. File sharing in encrypted file systems is a non-limiting example of an application for the inventive broadcast encryption. The Windows EFS has a limit of 256 KB in the file header for the EFS meta-data, and supports a maximum of 800 individual users. Assuming 32-bit users IDs, we can support 1000 users with a file header (S, ct) of size 4×1000+82×48=7936 bytes, where each user holds a secret key of size 67×96=6432 bytes. Results can be improved by setting $n_1=20$, $n_2=10$, $n_3=5$, which yields a header of size 4×1000+72×48=7456 bytes and a secret key of size 57×96=5482 bytes. However, since N=1000 is fairly small, the broadcast encryption scheme with $O(\sqrt{N})$ parameters would also achieve similar performances: a file header of size 4×1000+66×48=7168 and a secret key of size 68×96=6528 bytes.

System Implementations

The various embodiments may be implemented within a variety of communication systems, networks and/or mobile multi-media broadcast systems, an example of which is illustrated in FIG. 1. Specifically, FIG. 1 illustrates a communication system in which mobile receiver devices 102 may receive content from multimedia broadcast network 104, unicast network 106, or via the Internet 108. A typical multimedia broadcast network 104 includes a plurality of broadcast transmitters 112 controlled by a mobile broadcast network control center/broadcast operation center (BOC) 114. The multimedia broadcast network 104 broadcasts content from the broadcast transmitters 112 as mobile broadcast transmissions 113 for reception by the mobile receiver devices 102. Within the BOC 114, there may be one or more servers 110 for managing content broadcasts, and which provide a connection to the Internet 108.

In addition to the multimedia broadcast network 104, mobile receiver devices 102 may communicate via a unicast network 106, such as a cellular telephone network, WiFi network (not shown), WiMAX, etc. A typical cellular telephone network includes a plurality of cellular base stations 116 coupled to a network operations center 118. The network operations center 118 operates to connect voice and data calls between mobile receiver devices 102 and other network destinations, such as via telephone land lines (e.g., a POTS network, not shown) and the Internet 108.

Communications between mobile receiver devices 102 and the unicast network 106 may be accomplished via two-way wireless communication links 115 such as LTE, 4G, 3G, CDMA, TDMA, and other cellular telephone communication technologies. Such two-way wireless communication links 115 may enable users to stream multimedia content to receiver devices (e.g., mobile devices).

To facilitate Internet data communications (e.g., streaming video feeds), the unicast network 106 will typically include one or more servers 120 coupled to, or within, the network operations center 118 that provide a connection to the Internet 108. Mobile receiver devices 102 may further connect to the Internet 108 via a wired connection when available, in which case the Internet 108 may serve as the unicast network. Mobile receiver devices 102 may also receive non-broadcast content over the Internet 108 using well known conventional web-based access protocols.

Generally, the operations for receiving and rendering content by a receiver device (e.g., the mobile receiver devices 102 discussed above) may be divided into separate and independent groups or categories of operations, and each group or category of operations may be assigned to a layer (e.g., physical layer, data link layer, etc.). In each of these layers, various hardware and/or software components may implement functionality that is commensurate with responsibilities assigned to that layer. For example, media streams (e.g., broadcast, point-to-point, etc.) are typically received in the physical layer, which may include a radio receiver, buffers, and processing components that perform the operations of demodulating, recognizing symbols within the radio frequency (RF) signal, and performing other operations for extracting raw data from the received RF signal.

Figure 2:
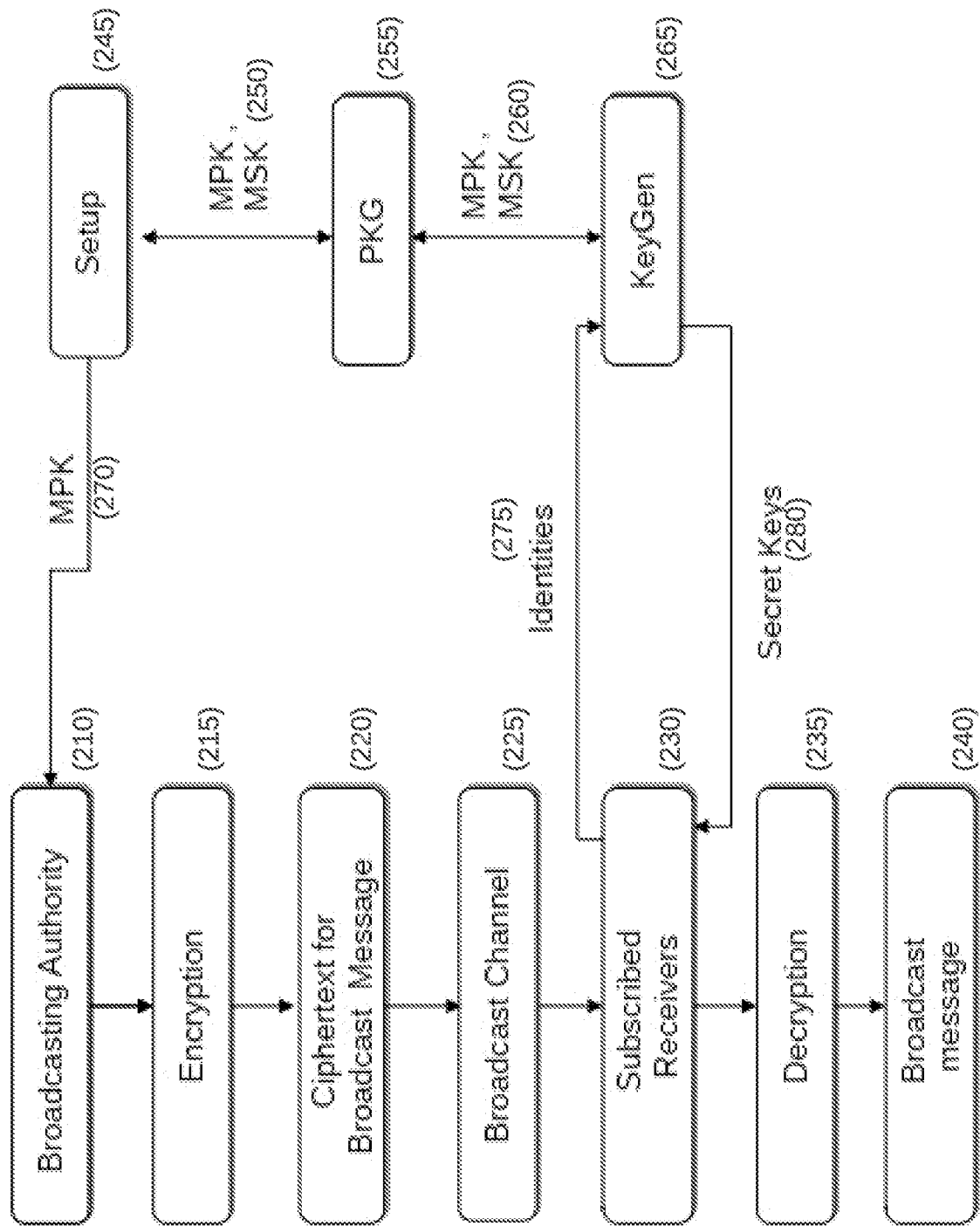
FIG. 2 illustrates an example computer-implemented method for the claimed broadcast encryption scheme.

FIG. 2 illustrates an example computer-implemented method for the claimed broadcast encryption scheme. In the illustrated example embodiment, setup routine generates master public key (MPK) 270 and provides it to the broadcasting authority 210. The key operations 245, 255, 265 may be performed at a centralized or trusted authority or third-party, which may or may not be associated with or controlled by broadcast authority 210. The setup routine 245 also generates the master secret key (MSK) 250. Setup routine 245 may be called by the private key generator (PKG) 255. PKG 255 outputs system master public-key MPK 250 and the system master secret-key MSK 250, and makes MPK publicly available and keeps MSK as a secret. Key generation routine 265 receives the MPK and MSK, and user identities 275, and outputs secret keys 280 for each specific user.

Broadcasting authority 210 then employs MPK 270 to perform an encryption 215, which is then used as the ciphertext for a broadcast message 220. The broadcast message is then provided over a broadcast channel 225, which as described herein can take any wired or wireless form. The ciphertext is received by subscribed receivers 230 who have been provided with certain key material 280 in association with their identities 275 which have been provided to a key generation module 265. The secret keys 280 can be provided to receivers based on their identities 275. With the secret keys, the subscribed receivers can perform a decryption 235 of the broadcast ciphertext, and generate a resulting broadcast message 240.

Figure 3:
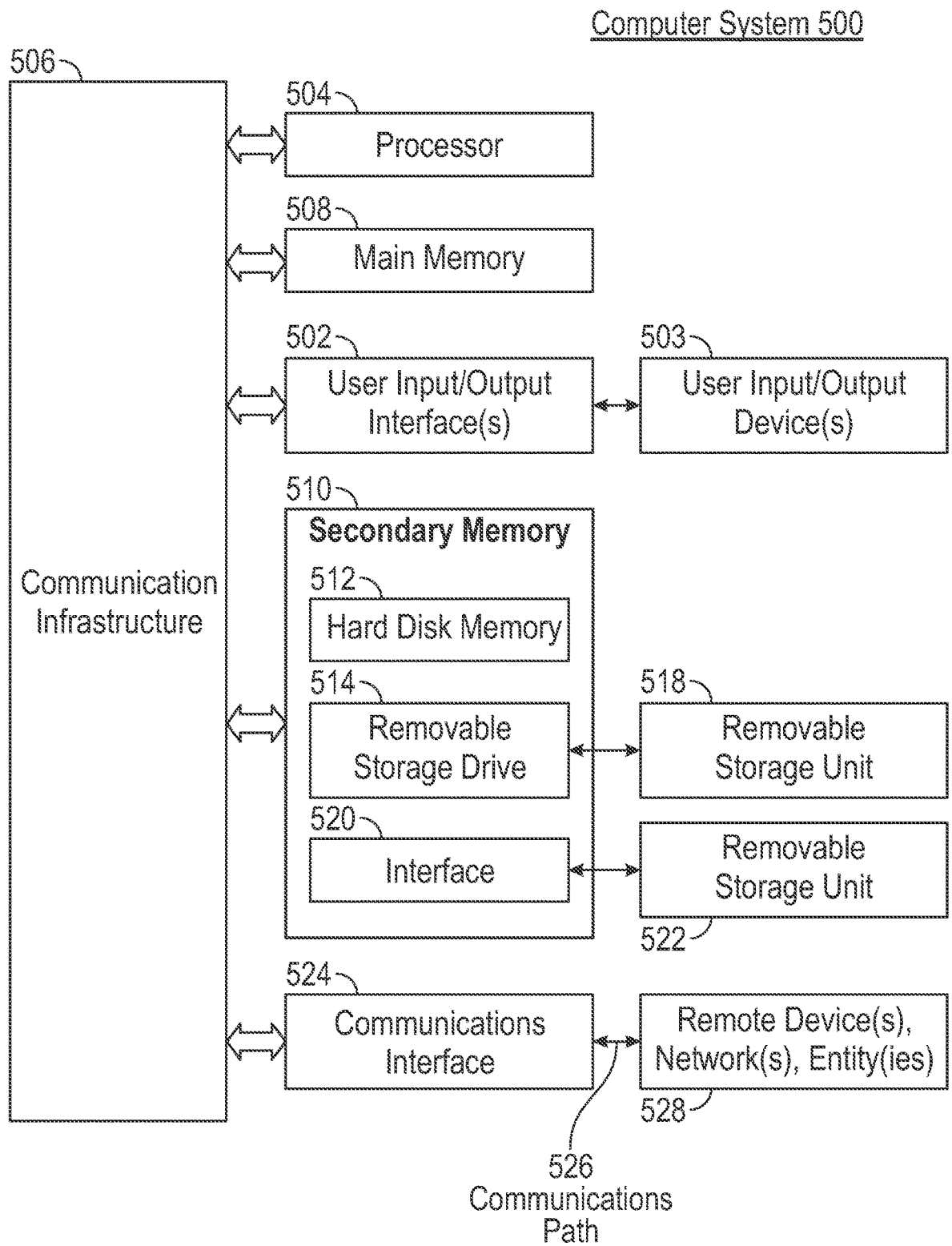
FIG. 3 illustrates an example computer system architecture for implementing the claimed systems and methods.
Figure 4:
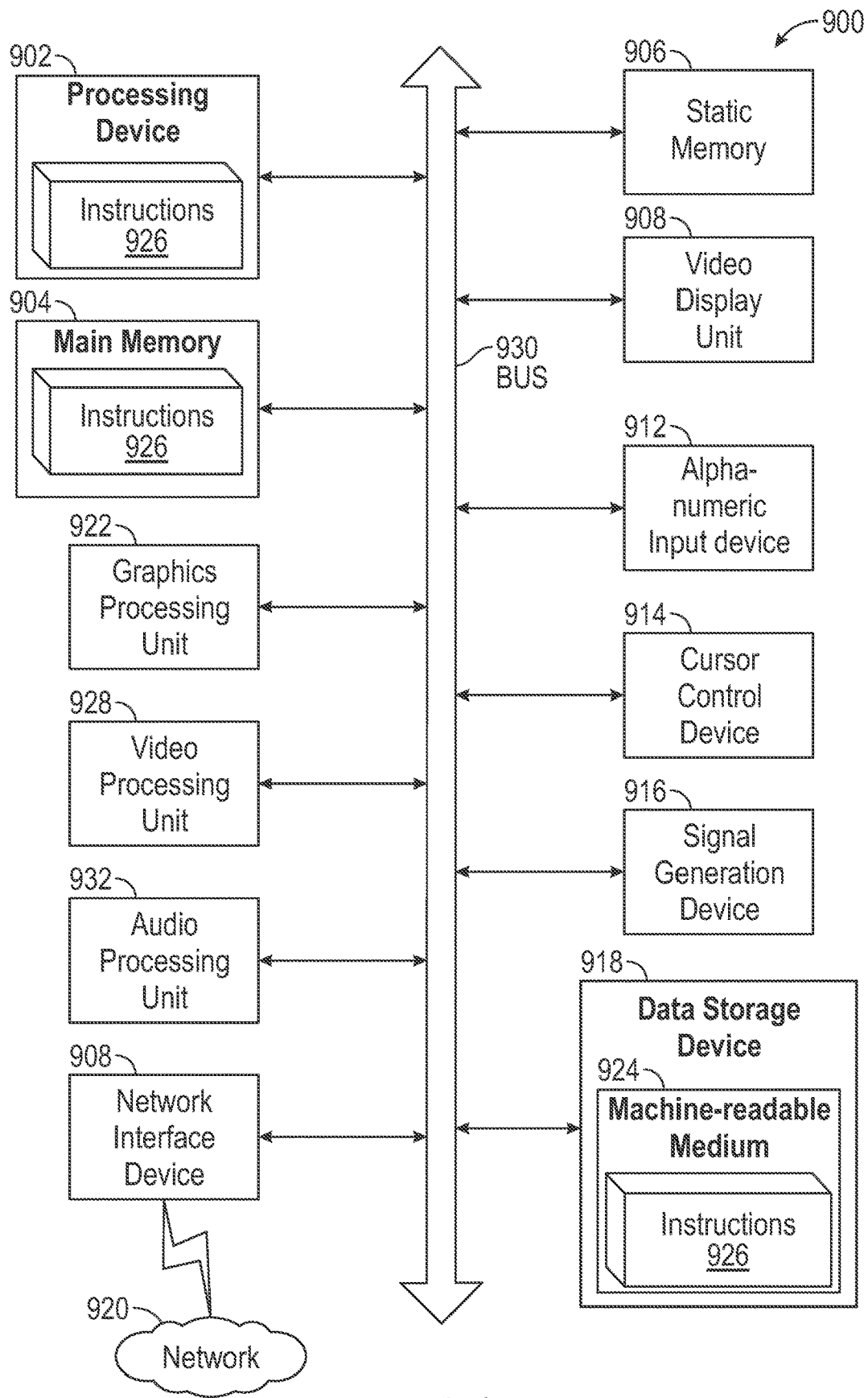
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for encrypting a message for transmitting over a broadcast network to multiple recipients as a ciphertext, the method comprising:

receiving an authorized recipient set S at a broadcast module, wherein the authorized recipient set identifies a set of recipients with permission to recover a broadcast message, wherein S is a subset of $\{1, 2, \ldots, N\}$, wherein n is an integer such that $n^3 \geq N$, and wherein N is the total number of possible recipients of the message;

generating a public key mpk at an authority, the public key mpk comprising:
a) a pairing group, the pairing group further comprising a first source group, a second source group, and a target group,
b) vectors $[v]_1$, $[w_1]_1$ and $[w_2]_1$ as n random group elements from the first source group,
c) a random group element $[v_0]_1$ from the first source group, and
d) a random group element a $[\alpha]_T$ from the target group;

receiving the public key mpk at the broadcast module from the authority;
receiving or creating a message M for encryption;
encoding the authorized recipient set S as a degree 3 polynomial,
wherein the degree 3 polynomial has a coefficient vector f equal to a characteristic vector of the recipient set S, and wherein the vector f has a length $n^3$;
cryptographically compressing the vector f using the vector $[w_2]_1$ of n group elements from the public key mpk and by sampling a random vector $w_3$ of n integers modulo p resulting in a digest of n group elements;
generating a ciphertext of message M by:
(a) sampling a random scalar s;
(b) multiplying the random scalar s with the digest, the vector $w_3$ and the public key mpk;
(c) concatenating the output of the multiplying to form the ciphertext;
(d) multiplying the random scalar s by $[\alpha]_T$ to derive $[\alpha s]_T$;
(e) masking message M with $[\alpha s]_T$; and
transmitting the masked message as a ciphertext and the authorized recipient set S to recipients on the broadcast network.

2. The method of claim 1, wherein generating the ciphertext is performed by executing:
parsing mpk=$([w_1]_1, [w_2]_1, [v_0]_1, [v]_1, [\alpha]_T)$;
sampling $s \leftarrow \mathbb{Z}_p$, $w_3 \leftarrow \mathbb{Z}_p^n$;
and outputting ciphertext $ct=[s]_1, [((I_n \otimes w_2 \otimes w_3)f^T + w_1^T)s]_1, [w_3 s]_1, [(v_0 w_3 + v)s]_1, [\alpha s]_T \cdot M$.

3. The method of claim 1, further comprising executing instructions for decrypting the ciphertext by a recipient to recover a broadcast message, the instructions configured for:
receiving the ciphertext and the authorized recipient set S at a receiver module from the remote broadcast module over the broadcast network, wherein the ciphertext further comprises a digest, and the digest further comprises information about the polynomial;
receiving a secret key from a remote authority module, the secret key comprising group elements from the second source group;
checking whether the recipient is in a set of authorized recipients;
computing the degree 3 polynomial that has a coefficient vector f equal to a characteristic vector of the authorized recipient set S;
wherein the degree 3 polynomial has a coefficient vector f equal to a characteristic vector of the authorized recipient set S, and wherein the vector f has a length $n^3$;
recovering the broadcast message by evaluating the polynomial with the digest using the group elements in a pairing algorithm; and
storing the recovered broadcast message for further processing at the receiver module.

4. A system for encrypting a message for transmitting over a broadcast network to multiple recipients as a ciphertext, comprising:
a network communication interface configured to communicate over a wired or wireless network;
a set of processing circuits coupled to the network communication interface, the processing circuits comprising modules configured for:
receiving an authorized recipient set S, wherein the authorized recipient set identifies a set of recipients with permission to recover a broadcast message, wherein S is a subset of $\{1, 2, \ldots, N\}$, wherein n is an integer such that $n^3 \geq N$, and wherein N is the total number of possible recipients of the message;
generating a public key mpk at an authority, the public key mpk comprising:
a) a pairing group, the pairing group further comprising a first source group, a second source group, and a target group,
b) vectors $[v]_1$, $[w_1]_1$ and $[w_2]_1$ as n random group elements from the first source group,
c) a random group element $[v_0]_1$ from the first source group, and
d) a random group element $[\alpha]_T$ from the target group;
receiving the public key mpk from the authority;
receiving or creating a message M for encryption;
encoding the authorized recipient set S as a degree 3 polynomial, wherein the degree 3 polynomial has a coefficient vector f equal to a characteristic vector of the recipient set S, and wherein the vector f has a length $n^3$;
cryptographically compressing the vector f using the vector $[w_2]_1$ of n group elements from the public key mpk and by sampling a random vector $w_3$ of n integers modulo p resulting in a digest of n group elements;
generating a ciphertext of message M by:
(a) sampling a random scalar s;
(b) multiplying the random scalar s with the digest, the vector $w_3$ and the public key mpk;
(c) concatenating the output of the multiplying to form the ciphertext
(d) multiplying the random scalar s by $[\alpha]_T$ to derive $[\alpha s]_T$;
(e) masking message M with $[\alpha s]_T$; and
transmitting the masked message as a ciphertext and the authorized recipient set S to recipients on the broadcast network S.

5. The system of claim 4, wherein generating the ciphertext is performed by executing:
parsing mpk=$([w_1]_1, [w_2]_1, [v_0]_1, [v]_1, [\alpha]_T)$;
sampling $s \leftarrow \mathbb{Z}_p$, $w_3 \leftarrow \mathbb{Z}_p^n$;
and outputting ciphertext $ct=[s]_1, [((I_n \otimes w_2 \otimes w_3)f^T + w_1^T)s]_1, [w_3 s]_1, [(v_0 w_3 + v)s]_1, [\alpha s]_T \cdot M$.

6. The system of claim 4, further configured for decrypting a ciphertext by a recipient to recover a broadcast message, including:
receiving the ciphertext and the authorized recipient set S at a receiver module from a remote broadcast module over the broadcast network, wherein the ciphertext further comprises a digest, and the digest further comprises information about the polynomial;
receiving a secret key, the secret key comprising group elements from the second source group;
checking whether the recipient is in a set of authorized recipients;

computing the degree 3 polynomial that has a coefficient vector f equal to a characteristic vector of the authorized recipient set S;

wherein the degree 3 polynomial has a coefficient vector f equal to a characteristic vector of the authorized recipient set S, and wherein the vector f has a length $n^3$;

recovering the broadcast message by evaluating the polynomial with the digest using the group elements in a pairing algorithm; and storing the recovered broadcast message for further processing at the receiver module.

7. A non-transitory computer-readable storage medium storing computer-executable instructions that, when executed by one or more processors of a computing device, configure the one or more processors to perform instructions for encrypting a message for transmitting over a broadcast network to multiple recipients as a ciphertext, the instructions comprising:

receiving an authorized recipient set S at a broadcast module, wherein the authorized recipient set identifies a set of recipients with permission to recover a broadcast message, wherein S is a subset of $\{1, 2, \ldots, N\}$, wherein n is an integer such that $n^3 \geq N$, and wherein N is the total number of possible recipients of the message;

generating a public key mpk at an authority, the public key mpk comprising:

a) a pairing group, the pairing group further comprising a first source group, a second source group, and a target group, b) vectors $[v]_1$, $[w_1]_1$ and $[w_2]_1$ as n random group elements from the first source group, c) a random group element $[v_0]_1$ from the first source group, and d) a random group element $[\alpha]_T$ from the target group;

receiving the public key mpk at the broadcast module from the authority;

receiving or creating a message M for encryption;

encoding the authorized recipient set S as a degree 3 polynomial, wherein the degree 3 polynomial has a coefficient vector f equal to a characteristic vector of the recipient set S, and wherein the vector f has a length $n^3$;

cryptographically compressing the vector f using the vector $[w_2]_1$ of n group elements from the public key mpk and by sampling a random vector $w_3$ of n integers modulo p resulting in a digest of n group elements;

generating a ciphertext of message M by:

(a) sampling a random scalar s;

(b) multiplying the random scalar s with the digest, the vector $w_3$ and the public key mpk;

(c) concatenating the output of the multiplying to form the ciphertext;

(d) multiplying the random scalar s by $[\alpha]_T$ to derive $[\alpha s]_T$;

(e) masking message M with $[\alpha s]_T$; and transmitting the masked message as a ciphertext and the authorized recipient set S to recipients on the broadcast network.

8. The non-transitory computer-readable storage medium of claim 7, wherein generating the ciphertext is performed by executing:

parsing mpk=$([w_1]_1, [w_2]_1, [v_0]_1, [v]_1, [\alpha]_T)$;

sampling $s \leftarrow \mathbb{Z}_p$; $w_3 \leftarrow \mathbb{Z}_p^n$;

and outputting ciphertext $$ct=[s]_1, [((I_n \otimes w_2 \otimes w_3)f^T + w_1^T)s]_1, [w_3 s]_1, [(v_0 w_3 + v)s]_1, [\alpha s]_T \cdot M.$$

9. The non-transitory computer-readable storage medium of claim 7, further comprising executing instructions for decrypting the ciphertext by a recipient to recover a broadcast message, the instructions configured for:

receiving the ciphertext and the authorized recipient set S at a receiver module from a remote broadcast module over the broadcast network, wherein the ciphertext further comprises a digest, and the digest further comprises information about the polynomial;

receiving a secret key from a remote authority module, the secret key comprising group elements from the second source group;

checking whether the recipient is in a set of authorized recipients;

computing the degree 3 polynomial that has a coefficient vector f equal to a characteristic vector of the authorized recipient set S;

wherein the degree 3 polynomial has a coefficient vector f equal to a characteristic vector of the authorized recipient set S, and wherein the vector f has a length $n^3$;

recovering the broadcast message by evaluating the polynomial with the digest using the group elements in a pairing algorithm; and storing the recovered broadcast message for further processing at the receiver module.

\* \* \* \* \*